US005289012A

United States Patent [19]

Alvarez

[11] Patent Number: 5,289,012

[45] Date of Patent: Feb. 22, 1994

[54] X-RAY IMAGE ENCODING BY SPATIAL MODULATION OF A STORAGE PHOSPHOR SCREEN

[76] Inventor: Robert E. Alvarez, 2369 Laura La., Mountain View, Calif. 94043

[21] Appl. No.: 877,893

[22] Filed: Apr. 30, 1992

[51] Int. Cl.[5] ........................ G03B 42/02; G01N 23/04

[52] U.S. Cl. ........................................ 250/588; 250/582

[58] Field of Search ........................................ 250/327.2

[56] References Cited

U.S. PATENT DOCUMENTS

| | | | |
|---|---|---|---|
| 4,029,963 | 6/1977 | Alvarez et al. | 250/360 |
| 4,382,184 | 5/1983 | Wernikoff | 378/62 |
| 4,413,353 | 11/1983 | Macovski et al. | 378/62 |
| 4,896,038 | 1/1990 | Nakajima | 250/327.2 |
| 5,185,777 | 2/1993 | Hasegawa | 250/327.2 |
| 5,221,843 | 6/1993 | Alvarez | 250/327.2 |

OTHER PUBLICATIONS

J. W. Goodman, Introduction to Fourier Optics, 1968, pp. 21-25, McGraw-Hill Book Co.

*Primary Examiner*—Carolyn E. Fields
*Assistant Examiner*—Drew A. Dunn

[57] ABSTRACT

Multiple x-ray images are encoded onto a single storage phosphor screen detector for later scanning, processing, and viewing. The x-ray images are encoded using spatial frequency multiplexing onto high frequency carriers. The encoding process relies only on light with no mechanical motion. The light erases selected portions of the image data but leaves sufficient information to reconstruct the original images. The reconstruction process relies on conventional sampling theory with the additional step of solving a system of equations for the individual x-ray image information.

9 Claims, 3 Drawing Sheets

X-RAY IMAGE ENCODING BY SPATIAL MODULATION OF A STORAGE PHOSPHOR SCREEN

This invention was made with Government support under Grant 1 R43 CA55430-01 awarded by the National Institutes of Health. The Government has certain rights in this invention.

BACKGROUND

1. Field of Invention

This invention relates to radiography. In a primary application the invention relates to the encoding of multiple x-ray images on a single storage phosphor screen detector.

2. Discussion of Prior Art

A widely used approach in x-ray imaging is to make multiple images of an object with changed conditions and then to process the image data to enhance the image or to extract more information. For example, in angiography, images are recorded before and after the injection of a radio-opaque contrast agent into the circulatory system. The images are then subtracted photographically to visualize only the blood vessels and eliminate the static anatomical features. Another example is energy selective radiography. Here, images are made using different effective x-ray energy spectra. The data from these images can be processed using the method described by U.S. Pat. No. 4,029,963 (1977) issued to R. E. Alvarez and A. Macovski. In accordance with this method, the data from two images are processed to calculate the photoelectric and Compton scattering components of the attenuation. These components, representing essentially atomic number and density, can be combined to represent different materials such as bone or soft tissue. These applications of multiple images all require spatially registered data, acquired in a short time, with good quantitative accuracy.

X-ray images are most commonly recorded on film. Although widely used, film has substantial problems for multiple image applications. It has excellent spatial resolution but poor quantitative capabilities. The quantitative response is critical because multiple image applications require processing of the image data instead of simply viewing it. With quantitative processing, such as subtraction, inaccuracies introduce errors in the final results. Film's quantitative response is highly nonlinear with a small dynamic range. Furthermore, the response depends critically on the development conditions and varies from film to film. Another problem is that multiple images must be recorded on different films. This makes it difficult to maintain spatial registration between the images on different films. It also requires a mechanical film changer which is made complex by several factors. First, the films are large, typically 35 cm, so it is difficult to move them rapidly. The changer must also use an intensifying screen. In medical radiographs, the x-ray photons do not expose the film directly. Instead, the x-rays are detected by the intensifying screen which produces visible light that, in turn, exposes the film as in a contact print. To avoid blurring the image, the film must be squeezed against the screen. Thus, the mechanical changer not only needs to move the films but to actuate a pressure to maintain screen/film contact. Because of all these factors, the time to change a film is long, one second or more. This is too slow to record rapidly changing structures such as the beating heart.

Some of these problems can be solved by encoding multiple images on a single film. This has the following advantages. Since the images are on one film, they are automatically spatially registered. The rate of image acquisition is multiplied by the number of images encoded. U.S. Pat. No. 4,413,353 (1983) "X-ray Encoding System Using an Optical Grating" issued to Macovski et al. describes an apparatus and method to effect this encoding. The method encodes multiple images by a technique analogous to amplitude modulation of radio waves. In accordance with the patent, the images are modulated by an optical grating placed between the intensifying screen and the film. The grating consists of alternating transparent and opaque stripes. The opaque stripes block visible light produced by the intensifying screen from reaching the film. The optical grating can be used to encode multiple images by making a first exposure, physically moving the grating by one half period, then making a second exposure. An alternative is to use an optical grating light valve whose alternate bars' light transmission can be switched off and on. Energy spectrum information can be encoded by changing the x-ray source spectrum between the exposures. The encoded images can be reconstructed by scanning the film and processing the resultant signal electronically.

The approach of U.S. Pat. No. 4,413,353 is limited to detectors with a separate light emitting intensifying screen and light recording medium. While this is the case with conventional film radiography, film has the quantitative problems mentioned above. The method also requires motion of the optical grating or a complex light valve. The grating must be moved precisely one half period and then pressure applied to maintain contact between the intensifying screen and the film. The light valve must be as large as the x-ray film and may contain thousands of elements.

An alternative to an intensifying screen/film detector with excellent quantitative properties is storage phosphor screens. X-ray imaging systems using these screens are described in U.S. Pat. No. 3,859,527 (1957) issued to G. W. Luckey. Storage phosphor screens function as a re-usable x-ray film. They are used in a cassette, similar to a film cassette, during medical examinations to acquire a an x-ray image. The image is stored as a latent image in the material of the screen. After the examination, the screens are removed from the cassette and scanned in a laser scanner. The scanner reads out the latent image from the screen and converts it to electronic digital signals. The digital signals are processed by a computer, then viewed on photographic film or on a cathode ray tube computer console. After the latent image is read out by the laser scanner, the screen can be erased and re-used. Storage phosphor screens have excellent quantitative properties. They have wide dynamic range (approximately 1000 to 1) and are linear and stable.

Storage phosphor screens, however, combine the functions of the intensifying screen and film in one screen so they can not be used with the approach of U.S. Pat. No. 4,413,353.

OBJECTS AND ADVANTAGES

Accordingly, several objects and advantages of the present invention are:

(a) to provide a method for encoding multiple x-ray images onto a storage phosphor screen;

(b) to provide a method for encoding multiple x-ray images onto a storage phosphor screen without mechanical motion of the encoding system;

(c) to provide a method for encoding multiple x-ray images onto a storage phosphor screen in a period of time substantially less than one second.

DRAWING FIGURES

In the drawings, closely related figures have the same number but different alphabetic suffixes.

REFERENCE NUMERALS IN DRAWINGS

| | |
|---|---|
| 10,10' Image Encoding Cassette | 12,12' Storage Phosphor Screen Detector |
| 14 Optical Chamber | 15 Projected Light Pattern |
| 16 Optical Grating | 17 Projection Optics |
| 18, 18' Controlled Light Sources | 19 Mirror |
| 20 Controller | 22,22',22" Optical Grating Stripes |
| 24 Beam Splitter | |

DESCRIPTION—FIGS. 1A AND 1B

Figure 1A:
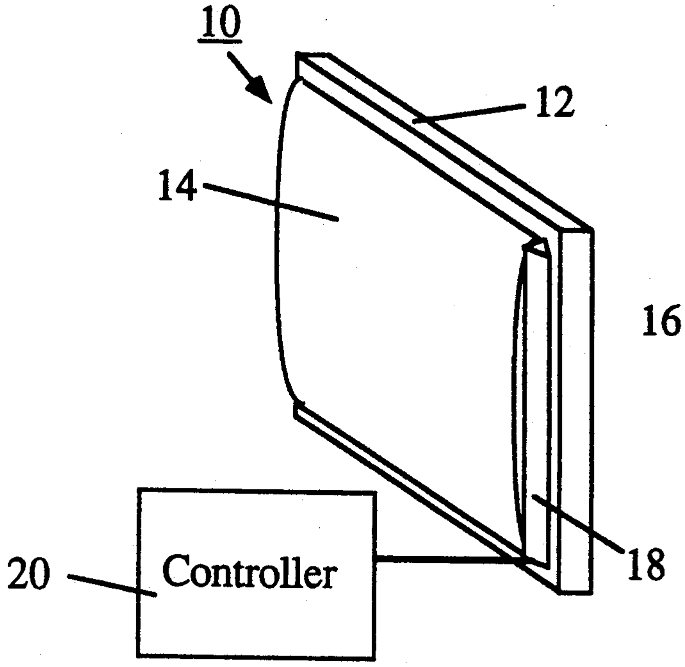
FIG. 1A shows an embodiment of the invention using an optical grating.
Figure 1B:
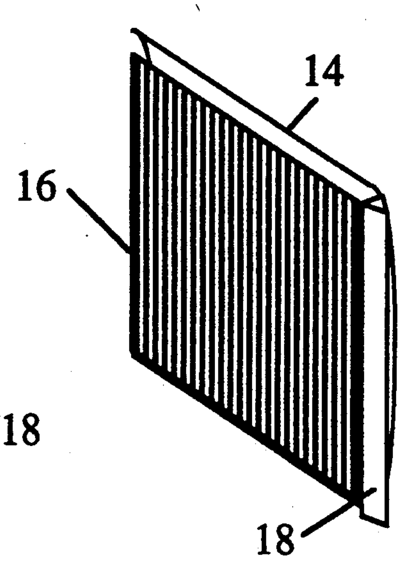
FIG. 1B is a view of the front part of the invention rotated so the optical grating is visible.

A typical embodiment of the present invention is illustrated in FIGS. 1A and 1B. A controller 20 is used to control an image encoding cassette 10 to record multiple x-ray images. An optical grating 16, an optical chamber 14, and a controlled light source 18 are used to illuminate storage phosphor screen 12 with a light intensity pattern consisting of a set of equally spaced illuminated and un-illuminated stripes. FIG. 1B shows a of the front portion of cassette 10 rotated so optical grating 16 is visible. Light source 18 and optical chamber 14 produce a uniform illumination on optical grating 16. Optical grating 16 has a set of transparent and opaque bars. Storage phosphor screen 12 is illuminated only in regions adjacent to the transparent bars of optical grating 16.

Light source 18 has a wavelength and intensity suitable for erasing the latent image on storage phosphor screen 12. The power supply of light source 18 turns the light source off and on within the period required by the x-ray exposures. Optical chamber 14 is constructed of a material with low x-ray attenuation such as plastic coated with a highly diffusely reflecting material. It need not provide any imaging characteristics but simply reflect the light throughout the surface of storage phosphor screen 12. It is made thin enough that the size of image encoding cassette 10 is compatible with conventional film cassettes. Optical grating 16 has lines spaced less than or equal to the required sampling for the image bandwidth. For example, an image bandwidth of 5 cycles per millimeter requires a period of 0.1 millimeter or less. Optical grating 16 is made of a material with low x-ray attenuation such as acrylic plastic.

Controller 20 interfaces with the rest of the x-ray system. It can be operated directly by an operator or controlled by another component of the x-ray system. It can be implemented with an electronic microprocessor.

OPERATION OF THE EMBODIMENT OF FIGS. 1A AND 1B

Figure 3:
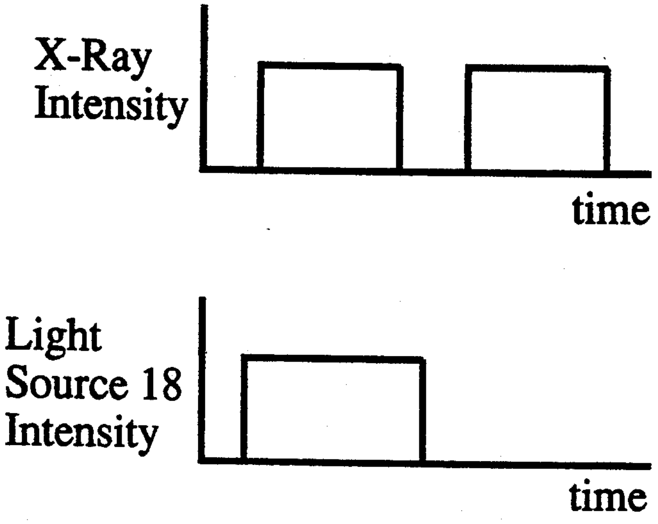
FIG. 3 shows graphs of the x-ray intensity and erasing light intensity for the embodiments of FIGS. 1A, 1B.

An understanding of the operation of the embodiment of FIGS. 1A and 1B may be obtained by referring to the time sequence of x-ray intensity and light source intensity in FIG. 3. An operator or external system signals controller 20 to prepare to receive a first x-ray image. The x-ray system is turned on for the first exposure and controller 20 causes light source 18 to turn on. At the end of the first x-ray exposure, controller 20 shuts off light source 18. The operator or external system then signals controller 20 to prepare to receive a second image. The x-ray system is turned on for the second exposure and and controller 20 keeps light source 18 switched off. At the end of the two exposures, samples of the second x-ray image only are recorded on storage phosphor screen 12 in the regions adjacent to the transparent bars of optical grating 16. The sum of the first and second x-ray images is recorded on storage phosphor screen 12 in the regions adjacent to the opaque bars of optical grating 16. Storage phosphor screen 12 is scanned in a conventional laser scanner and the data processed to reconstruct the two images.

THEORY OF OPERATION—FIGS. 1A AND 1B

The present invention depends on the properties of storage phosphors. A storage phosphor stores a latent x-ray image as electrons trapped in high energy metastable (i.e. long term stable) sites. During the x-ray exposure, x-ray photons interact with the phosphor creating high energy electrons. Some of these high energy electrons are trapped in the metastable sites creating the latent image. The trapped electrons can be released from the metastable sites by shining light on the phosphor. When they are released, they emit light in proportion to the total x-ray flux incident on the screen. The image is read out by scanning a focused laser beam over the surface of the screen The resultant emitted light is detected by a photodetector, such as a photomultiplier tube, producing an electronic signal. The electronic signal is converted to digital data which are processed and displayed.

Light with a properly chosen wavelength must be used to read out or erase the latent image. The light photons need to have sufficient energy to release the trapped electrons but not enough energy to raise ground state electrons to the metastable states. The energy E is related to their wavelength λ by Planck's relation, $$E = \frac{hc}{\lambda},$$

where h is Planck's constant and c is the speed of light. Before use, the screen is exposed to light with this wavelength. This light releases essentially all the trapped electrons from past exposures leaving a blank screen ready to store a new image. A band of light wavelengths is suitable for erasing so broad spectrum sources can be used. With some phosphors, a higher temperature is sufficient to release the trapped electrons.

An important fact for the present invention is that the erasing process can work during the x-ray exposure. Then there will be two competing processes: the x-ray photons populating the metastable sites and the light illumination releasing them. If the light has a sufficiently high intensity, essentially no latent image will remain. Therefore, by using light, one can select which of several x-ray exposures is recorded on a screen. Light, of a suitable wavelength and intensity, incident on a region of a storage phosphor screen erases the latent image of all past x-ray exposures from that region. Heat could also be used for erasing some phosphors.

Another fact important for the present invention is that the erasing process only occurs in regions that are illuminated. If only part of a screen is illuminated, only that part will be erased and the rest of the screen will still contain the latent image. With some phosphors, part of the screen could also be erased by selectively heating that region.

The operation of the invention also depends on sampling theory. The well-known Nyquist-Shannon sampling theorem states that a finite bandwidth signal can be completely recovered from its values at a set of equally spaced points if the distance between the points is small enough. The theorem states that a spacing smaller than one divided by twice the maximum frequency component of the signal is sufficient to reconstruct it. Since all physically generated signals, such as x-ray images, must have a finite bandwidth, the theorem can be applied to our results.

Figure 4:
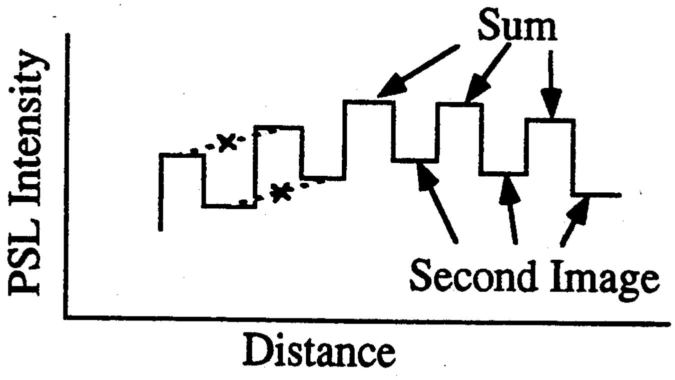
FIG. 4 is a graph showing the signal from one scan line of a one dimensional grating modulated image.

Suppose we expose the screen simultaneously to an x-ray flux and erasing light in regions determined by an optical grating as illustrated in FIGS. 1A and 1B. The optical grating has low x-ray attenuation so it will not affect the x-ray flux. The light, however, will erase the latent image on a set of equally spaced stripes and leave the original data in the space between the stripes. Then suppose we expose the screen to a second x-ray flux with the erasing light source shut off. FIG. 4 shows the signal from scanning a single line across the storage phosphor screen perpendicular to these lines. Alternate regions contain the second image and the sum of the first and second images as shown. A simple way to reconstruct the sampled signals is to linearly interpolate between adjacent values as shown in FIG. 3. More accurate ways to reconstruct the encoded images using filtering are well known in the art. So long as the spacing of the erased lines is sufficiently small, the sampling theorem can be applied to the data from each scan line to reconstruct the second and the sum images. By substracting the second image from the sum, we can recover the first image.

Thus, we have the surprising result that we can use erasing of data to encode and reconstruct multiple images from the data on a single storage phosphor screen. The method of U.S. Pat. No. 4,413,353 will not work for storage phosphor screen detectors, only for systems where intensifying screen and film are separated. It requires mechanical translation of the complete optical grating or a complex light valve to encode multiple images. With the present invention, the erasing is done with a stationary optical grating by turning a single light source off and on. This can be done orders of magnitude faster than mechanical motion.

DESCRIPTION—FIG. 2

Figure 2:
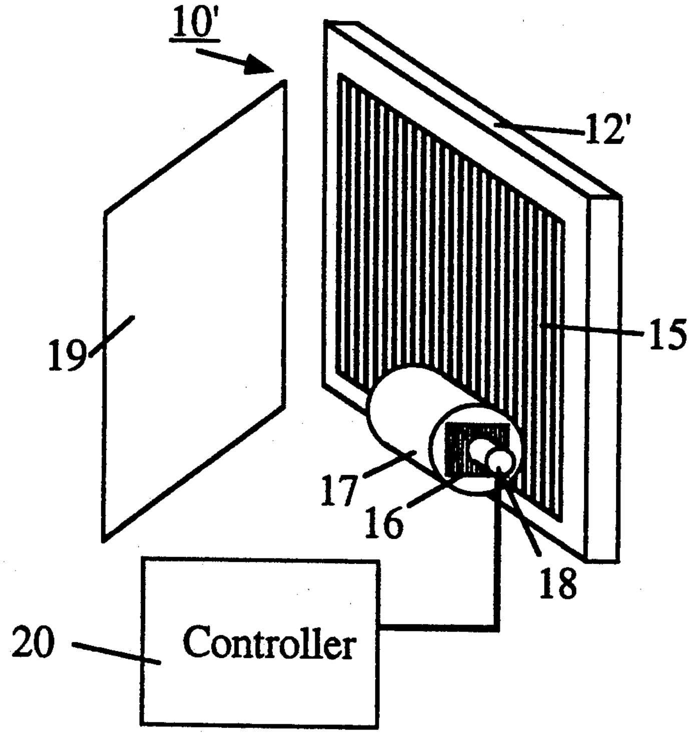
FIG. 2 shows an embodiment using projection optics.

In the embodiment of FIG. 1A, optical grating 16 must be extremely close to storage phosphor screen 12 to avoid blurring of the light intensity pattern. This can cause problems if the invention is used in conjunction with screen changers which must move the screens rapidly. In this case, the embodiment of FIG. 2 is preferable because the light intensity pattern is projected onto storage phosphor screen 12' optically. In FIG. 2, controlled light source 18, optical grating 16, and projection optics 17 create a projected light pattern 15 on the surface of storage phosphor screen 12'. To avoid attenuating the x-ray beam, a mirror 19 folds the light from projection optics 17 so the optics can be placed to one side of the x-ray path.

Mirror 19 is made from a material with low x-ray attenuation such as acrylic plastic. Optical grating 16 and projection optics 17 produce a light intensity pattern consisting of alternating regions of light and non-illuminated regions on the surface of storage phosphor screen 12'. The spacing of the light and dark regions is small enough so that the sampled data can be used to reconstruct the x-ray images according to the sampling theorem.

OPERATION—FIG. 2

The embodiment of FIG. 2 operates similarly to the embodiment of FIGS. 1A and 1B. The same sequences of x-ray intensity and erasing light source intensity illustrated in FIG. 2 are used.

DESCRIPTION—FIG. 5

Figure 5:
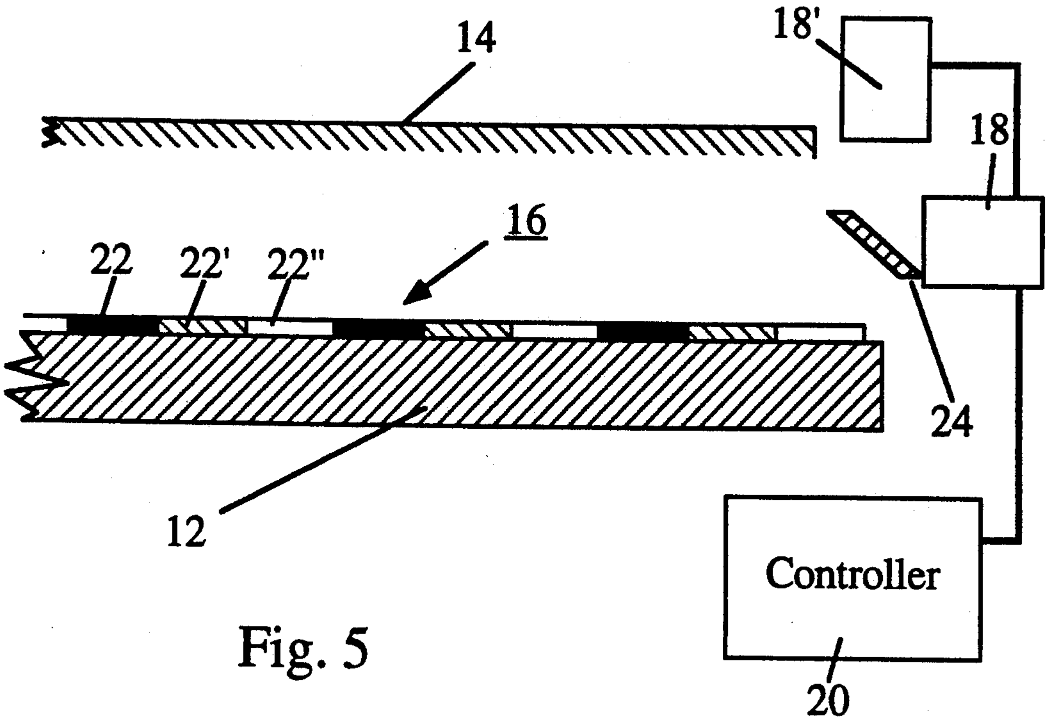
FIG. 5 shows a cross section of an embodiment for encoding more than two images using an optical grating with bars having different color transmission.

More than two images can be encoded on a single screen with the present invention. FIG. 5 shows an embodiment for encoding three images using an optical grating 16 with sets of three stripes 22,22', and 22'' having different color transmission. Two light sources 18 and 18' produce light with different color spectra. Both light spectra produced by the light sources are suitable for erasing storage phosphor screen 12. A beam splitter 24 allows light from both sources to enter optical chamber 14. Stripes 22,22', and 22'' of optical grating 16 have light transmission with the following properties:

- stripe 22 is opaque and blocks both spectra from light sources 18 and 18';
- stripe 22' transmits only the spectrum from light sources 18;
- stripe 22'' is transparent and transmits both spectra from the light sources.

OPERATION—FIG. 5

Figure 6:
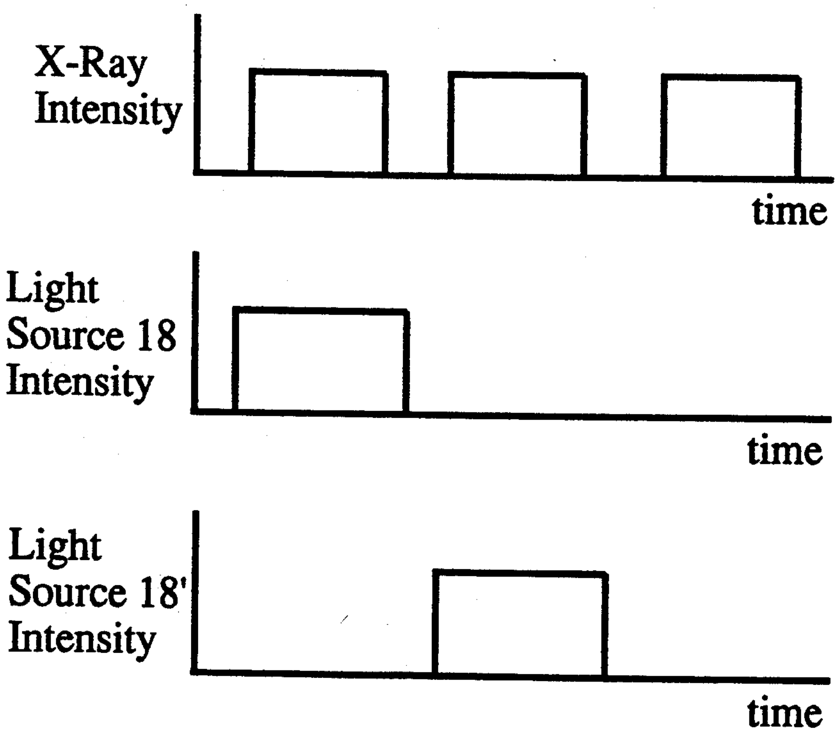
FIG. 6 shows graphs of the x-ray intensity and two light source intensities for the embodiment of FIG. 5.

An understanding of the operation of the embodiment of FIG. 5 may be obtained by referring to the time sequence of x-ray intensity and light sources intensities in FIG. 6. An operator or external system signals controller 20 to prepare to receive a first x-ray image. Controller 20 then causes light source 18 to turn on. At the end of the first x-ray exposure, the operator or external system signals controller 20 to prepare to receive a second image. Controller 20 then switches off light source 18 and switches on light source 18'. At the end of the second x-ray exposure, the operator or external system signals controller 20 to prepare to receive a third image. Controller 20 then switches off both light sources 18 and 18' during the third exposure. At the end of the three exposures, storage phosphor screen 12 can be scanned in a conventional laser scanner and the data processed to reconstruct the three images as follows.

If the period of the sets of three stripes in optical grating 16 satisfies the requirements of the sampling theorem, the data from the samples under each color stripe can be used to reconstruct three images. Let $I_o$, $I_c$ and $I_t$ be the data from corresponding pixels of the three images. That is, $I_o$, $I_c$ and $I_t$ are the data from the reconstruction of the opaque stripe, color filter, and transparent region respectively. Let $I_1$, $I_2$ and $I_3$ be the data from the three x-ray exposures. Then, because of the erasing of storage phosphor screen 12

$$I_o = I_1 + I_2 + I_3,$$

$$I_c = I_2 + I_3,$$

$$I_t = I_3.$$

These three equations can be easily solved for the data from the three individual images as follows:

$$I_1 = I_o - I_c,$$

$$I_2 = I_c - I_t,$$

$$I_3 = I_t.$$

Optical grating 16 is made from a material with low x-ray attenuation such as acrylic plastic with stripes of predetermined color transmission printed on it. Light sources 18 and 18' can be broad spectrum white light sources passed through color filters.

SUMMARY, RAMIFICATIONS AND SCOPE

Accordingly, the reader will see that the x-ray encoding system of this invention can be used to encode multiple x-ray images on a single storage phosphor screen for later reconstruction. The system uses optical techniques to achieve high resolution and ease of implementation with no mechanical motion. The optical gratings are passive light absorbing structures not complex active switched light valves. The system uses storage phosphor screens to provide much better quantitative accuracy than film. The system can be implemented in a cassette compatible with conventional film cassettes or with optical projection for no mechanical contact of the screens in a screen changer. The system can be used to encode three or more x-ray images on a single screen.

Although the description above contains many specificities, these should not be construed as limiting the scope of the invention but merely providing illustrations of the presently preferred embodiments of this invention. For example:

(a) The erasing patterns do not have to be straight lines. The discussion of the two-dimensional sampling therorem in Introduction to Fourier Optics by J. W. Goodman (1968, McGraw-Hill, pp. 21-25) shows that the sample points can be arranged in many different two-dimensional periodic patterns.

(b) Projection optics instead of gratings can be used to encode three or more images.

(c) The gratings and illumination patterns can be at angles other than ninety degrees to the scanning direction (d) Reference patterns with the same period and phase as the encoded data can be recorded on the periphery of the screen to be used during the scanning to synchronize measurements with the patterns.

(e) Localized temperature increases such as from small heat sources could be used to erase the information instead of light.

Thus the scope of the invention should be determined by the appended claims and their legal equivalents, rather than by the examples given.

What is claimed:

1. Apparatus for encoding x-ray image information comprising:

(a) a storage phosphor screen detector;

(b) a controller means; and, (c) a controlled erasing means for erasing latent x-ray image information recorded by said storage phosphor screen detector in a set of regions spaced periodically across the surface of said storage phosphor screen detector;

wherein the remaining image information can be used to reconstruct a representation of said x-ray image information.

2. Apparatus of claim 1 wherein said controlled erasing means comprises:

(a) a controlled light source means for producing light suitable for erasing latent x-ray image information recorded by said storage phosphor screen detector;

(b) an optical chamber means for guiding light from the light source means to the surface of the storage phosphor screen detector;

(b) an optical grating comprised of a set of groups of parallel stripes with different optical transmissions arranged in a plane contiguous to each other;

wherein said optical grating interrupts light in said optical chamber means from reaching the surface of said storage phosphor screen detector.

3. Apparatus of claim 2 wherein said groups of parallel stripes comprise pairs of parallel strips with one member of each pair substantially transparent and the other member substantially opaque to the erasing light.

4. Apparatus of claim 2 wherein:

(a) said controlled light source means comprises means for producing light with different light wavelength spectra; and (b) said groups of parallel stripes comprise groups of three or more parallel stripes with one member of each group substantially opaque to all the light spectra, another member substantially transparent to all the light spectra and the remaining members each substantially transparent to a predetermined one of said light spectra.

5. Apparatus of claim 1 wherein said controlled erasing means comprises:

(a) a controlled light source means for producing light suitable for erasing latent x-ray image information recorded by said storage phosphor screen detector;

(b) an optical grating comprised of a set of groups of parallel stripes with different optical transmissions arranged in a plane contiguous to each other;

(c) light projection optics means for projecting an image of the light from said controlled light source means transmitted by said optical grating onto the surface of said storage phosphor screen detector.

6. Apparatus of claim 5 wherein said groups of parallel stripes comprise pairs of parallel strips with one member of each pair substantially transparent and the other member substantially opaque to the erasing light.

7. Apparatus of claim 5 wherein:

(a) said controlled light source means comprises means for producing light with different light wavelength spectra; and (b) said groups of parallel stripes comprise groups of three or more parallel stripes with one member of each group substantially opaque to all the light spectra, another member substantially transparent to all the light spectra and the remaining members each substantially transparent to a predetermined one of said light spectra.

8. In a method for encoding x-ray image information onto a storage phosphor screen detector for subsequent decoding the steps of:

(a) irradiating said detector with an x-ray image creating a latent image in said detector;

(b) erasing said detector with erasing means for erasing said latent image in a set of regions spaced periodically across the surface of the storage phosphor screen;

wherein the remaining image information can be used to reconstruct a representation of said x-ray image information.

9. The method of claim 8 including the steps of repetitively:

(a) irradiating said detector with an additional x-ray image;

(b) erasing said storage phosphor screen detector with erasing means for erasing the latent image of said x-ray image recorded by said detector in a set of regions spaced periodically across the surface of the storage phosphor screen and translated with respect to the previous sets of regions;

wherein the remaining image information can be used to reconstruct a representation of all of the x-ray images.

* * * * *